United States Patent Office 3,111,006
Patented Nov. 19, 1963

3,111,006
NOVEL METHOD FOR INJECTING CLAY-CONTAINING GROUT INTO GROUND AND PRODUCTS SERVING FOR THE EXECUTION OF SAID METHOD
Claude Caron, Paris, France, assignor to Soletanche, Paris, France
No Drawing. Filed June 7, 1960, Ser. No. 34,377
Claims priority, application France June 19, 1959
4 Claims. (Cl. 61—36)

The techniques applied for injecting grout into sandy and alluvial ground require generally, in the case of coarse alluvia, mixtures of cement and clay and, in the case of fine sands, the use of mixtures having as a base sodium silicate. It has been proposed in the last few years to use clay alone, since, clay being finer than cement, suspensions of clay allow treating much less pervious alluvial grounds than with mixtures of clay and cement. Furthermore, clay is always floculated by the calcium ions of cement and, consequently, it is not possible to benefit by the considerable fineness of clay when admixed with cement.

The drawback of injections made with pure clay consists in the fact that the grout does not harden with time and, consequently, it can be driven out readily through the pressure of water contained in the ground associated therewith.

The use of bentonitic clays of a thixotropic type allows removing partly said drawback, but such clays are expensive and are not found everywhere and, furthermore, the resistance provided thixotropically is comparatively low.

It has been proposed since several years to bestow a certain resistance to grouts made of pure clay by incorporating therewith sodium silicate and calcium chloride, or else, sodium aluminate.

Such a method leads to the formation of a gel inside the clay, which allows thus a suitable resistance, but calcium chloride, as also sodium aluminate form a powerful floculating agent for clay, and it may even serve as a floculating agent for the clarification of water. Thus, the mixture obtained is heterogeneous and there is formed, on the one hand, a jellified liquid phase and, on the other hand, a clayey phase entering the ground with difficulty. It appears therefore of interest to find a reagent jellifying silica without having any deterimental effect on the clay.

After extensive searches, we have found that monoalkaline phosphates or mixtures of phophoric acid with an alkaline phosphate satisfy both said conditions.

The relative percentage of monosodium or monopotassium phosphate and of alkaline silicate depends on the nature of the clay and the weight of both components may range between 0.5 to 6% of the weight of water used.

The optimum concentration of the two reagents depends on a number of parameters such as the mineralogical nature of the clay, the pH and the concentration and nature of the adsorbed ions; it is impossible to define said concentration once and for all, and a preliminary investigation in the laboratory is necessary for each particular case.

We will now disclose, by way of example and by no means in a binding sense, a number of compositions of a grout obtained with various types of clays, all said components showing a resistance above 10 gr. per sq. cm. against shearing.

Water ------------------------------------litre-- 1
French clay with a limited liquidity equal to 110% -----------------------------------gr-- 300
Monosodium phosphate---------------------gr-- 7
Silicate ---------------------------------cc-- 4.2
Water ------------------------------------litre-- 1
Canadian clay with a limit liquidity equal to 60% ------------------------------------gr-- 600
Monosodium phosphate---------------------gr-- 8.5
Silicate ---------------------------------cc-- 31
Water ------------------------------------litre-- 1
Pakistanian clay with a limited liquidity equal to 45% ---------------------------------gr-- 600
Monosodium phosphate---------------------gr-- 18
Silicate ---------------------------------cc-- 41
Water ------------------------------------litre-- 1
English treated clay with a limited liquidity equal to 400% -------------------------gr-- 150
Monosodium phosphate---------------------gr-- 5
Silicate ---------------------------------cc-- 13

The chemical and mineralogical nature of the clays or marls used varies to a considerable extent and it is possible to use kaolinite, montmorillonite, illite, etc. The swelling properties of said clays are also highly variable since clay from Pakistan has a limited liquidity equal to 45%, whereas English clay may contain as much as 400%.

The proportions given in the above examples are those which ensure the best results, but they may vary between comparatively large limits, without the products obtained lying outside the scope of the invention as defined in the accompanying claims.

What I claim is:

1. In a method of soil solidfication, the step of injecting into soil to be solidified a grout-like aqueous mixture of a major proportion of clay, and a minor proportion of alkali silicate and of at least one phosphate selected from the group consisting of monosodium phosphate and monopotassium phosphate.

2. In a method of soil solidfication, the step of injecting into soil to be solidified a grout-like aqueous mixture of a major proportion of clay, and a minor proportion of alkali silicate and monosodium phosphate.

3. In a method of soil solidification, the step of injecting into soil to be solidified a grout-like aqueous mixture of a major proportion of clay, and a minor proportion of alkali silicate and monopotassium phosphate.

4. In a method of soil solidfication, the step of injecting into soil to be solidified a grout-like aqueous mixture of a major proportion of clay, and a minor proportion of alkali silicate and of at least one phosphate selected from the group consisting of monosodium phosphate and monopotassium phosphate, the quantity of alkali silicate and of said phosphate, respectively, being equal to between 0.5 and 6% of the quantity of water contained in said mixture.

References Cited in the file of this patent

UNITED STATES PATENTS

| | | |
|---|---|---|
| 1,408,960 | Schiff | Mar. 7, 1922 |
| 1,581,732 | Hageman | Apr. 20, 1926 |
| 1,975,077 | Boughton | Oct. 2, 1934 |
| 2,077,258 | Pitt | Apr. 13, 1937 |
| 2,895,838 | Ilenda | July 21, 1959 |
| 2,899,330 | Lyons | Aug. 11, 1959 |
| 2,964,415 | Payne | Dec. 13, 1960 |

FOREIGN PATENTS

| | | |
|---|---|---|
| 416,966 | Great Britain | 1934 |
| 464,967 | Great Britain | 1937 |
| 165,763 | Australia | 1953 |
| 537,873 | Canada | 1957 |

OTHER REFERENCES

Condensed Chemical Dictionary, by Reinhold publishing Corp., 1956, p. 1009.